March 22, 1966  D. A. WEBER  3,241,674
CONCENTRATING TABLE
Filed Feb. 6, 1961  8 Sheets-Sheet 1

FIG.1

INVENTOR:
DON A. WEBER

BY Sutherland Robert Taylor
ATTORNEYS,

March 22, 1966  D. A. WEBER  3,241,674
CONCENTRATING TABLE
Filed Feb. 6, 1961  8 Sheets-Sheet 3

INVENTOR:
DON A. WEBER
BY [signature]
ATTORNEYS,

March 22, 1966 D. A. WEBER 3,241,674
CONCENTRATING TABLE
Filed Feb. 6, 1961 8 Sheets-Sheet 4

INVENTOR:
DON A. WEBER

ATTORNEYS.

March 22, 1966 D. A. WEBER 3,241,674
CONCENTRATING TABLE
Filed Feb. 6, 1961 8 Sheets-Sheet 6

FIG.6

INVENTOR:
DON A. WEBER
BY
ATTORNEYS,

March 22, 1966 D. A. WEBER 3,241,674
CONCENTRATING TABLE
Filed Feb. 6, 1961 8 Sheets-Sheet 7

INVENTOR:
DON A. WEBER

March 22, 1966     D. A. WEBER     3,241,674
CONCENTRATING TABLE Filed Feb. 6, 1961     8 Sheets-Sheet 8

INVENTOR:
DON A. WEBER

BY *Sutherland Platt & Taylor*
ATTORNEYS.

United States Patent Office 3,241,674
Patented Mar. 22, 1966

3,241,674
CONCENTRATING TABLE
Don A. Weber, Fort Wayne, Ind., assignor to The Deister Concentrator Company, Inc., Fort Wayne, Ind., a corporation of Indiana
Filed Feb. 6, 1961, Ser. No. 87,143
21 Claims. (Cl. 209—441)

This invention relates to pendantly supported multiple deck concentrating tables, and has for its general object to so improve such tables that they may be used in ore dressing operations with proficiency comparable to that of single deck, foundation-mounted, tables of the character heretofore used for ore dressing, but with greatly increased capacity per unit of floor area occupied.

Concentrating tables of the single deck, foundation-mounted, type have been used extensively for ore dressing, coal washing and other mineral separations. Such tables consist essentially of a deck over which particulate material being treated is caused to pass, and some means for rapidly reciprocating the deck in a manner tending to move the particles of highest specific gravity in one direction, while the particles of lowest specific gravity are moved in another direction, whereby to separate the heavier from the lighter particles. Some means for depositing the raw heterogeneous material (usually in a water slurry) upon the table, some means for sweeping part of the deck with a sheet of water (called "wash water" in the parlance of the coal cleaning art, but "dressing water" in the parlance of ore concentration), and some means for collecting the separated fractions of treated material must also be provided. While the surface of the deck over which the material is caused to travel, while undergoing separation is, in a general sense, flat, it is common to provide the deck surface with small upwardly projecting ribs, called "riffles." The riffles not only impede the movement of heavier particles in the direction in which the lighter particles tend naturally to be carried by the sheet of water, but also assist the reciprocation in moving the heavier particles in a different direction.

While the efficiency of concentrating tables as a gravity separation apparatus has long been recognized by the mining industry, there are two factors which have militated against their use, to wit: (1) per unit of production capacity, they required considerably more floor area than less efficient types of equipment for the same purpose; and (2) the vibrations set up by them required that the building structures to house them be extraordinarily rugged and hence expensive. Insofar as concerns coal washing operations, these objections were substantially obviated by tables constructed as shown in British Patent No. 837,136; but while such tables have gone into extensive use for coal cleaning, they are not suitable for ore dressing operations.

While coal cleaning and ore dressing are alike in theory, they are antithetical as concerns many aspects of the practical operation of concentrating tables. In coal cleaning, the emphasis is upon volume of production, while in ore dressing, the emphasis is upon completeness of separation. A coal cleaning operation may be considered efficient even though it wastes a higher percentage of good coal than there is of value in many ores which are dressed on concentrating tables. Although there are some exceptions, the following table shows contrasts which exist generally as between coal cleaning and metallic ore dressing operations:

| | Coal Cleaning | Ore Dressing |
|---|---|---|
| The low specific gravity fraction of the material being treated is the ______ | value. | reject. |
| The high specific gravity fraction of the material being treated is the ______ | reject. | value. |
| The percentage of value in the material being treated is normally ______ | 80-85%. | from less than 1% to about 60%. |
| The percentage of value in the material being treated at a given installation is ______ | fairly constant over long periods of time. | subject to wide variation in the course of a normal day's operation. |
| The value is recovered from the material being treated at the ______ | side of the deck. | end of the deck. |
| The tonnage of material treated on a deck normally runs ______ | 10-15 or more tons per hour. | from less than 1 to about 3 tons per hour. |
| The bed of material undergoing treatment on a deck runs ______ | thick. | thin. |
| The fines under about 200 mesh are ______ | largely wasted by suspension in wash water. | frequently the value. |

These conditions dictate that ore dressing requires the machine to be more definitive in its action, more subject to nicety of adjustment during operation, more sensitive and quickly responsive to fine adjustments, and more free of secondary motions, than for coal cleaning. Some of these desiderata are superficially inconsistent one with the other. For example, sensitivity and quick response to fine adjustments dictates lightness of weight for minimum inertia, while lightness of weight tends toward resilience and invites secondary motion which impairs the definitiveness of the separation. Coincidence of mass center of each reciprocating deck (including the material in process on the deck) with the vertical plane embracing the center line of the driving force is the optimum condition, but is seldom achievable in practice not only because of the eccentricity introduced by the making of adjustments, but because of the changing consist (and consequent change in distribution over the deck) of the material being treated. Change in distribution over the deck is not normally encountered in serious degree with coal washing operations except at the beginning and shut-down of operation, and hence is not of long duration; but is constantly occurring with ore dressing operations in such degree as to necessitate frequent adjustment of "side tilt," ofttimes when it is undesirable to interrupt the operation of the machine. The fact that, in coal cleaning operations, the decks run with a thick bed of material on them makes the laden deck heavier than in the case of ore dressing operations, and the added weight tends to stabilize the deck against secondary motion induced not only by lack of coincidence between the mass center and the vertical plane embracing the center line of the driving force, but also by lack of parallelism between the line of motion of a point on the deck and the center line of the driving force. Another expedient used (in coal cleaning operations with tables of the character shown in the aforesaid British patent) to stabilize the decks against secondary motion was the addition of weight to the floating structure, but, as suggested above, such is incompatible with the sensitivity so important in ore dressing operations.

It was early observed that tables of the character disclosed in said British patent operated most efficiently with less "end elevation" than conventional foundation-mounted single deck tables, although the decks were identical. This has been a mystery, but the cause for it has now been discovered. Rectification of the cause as hereinafter disclosed (although it has not yet been proved for coal cleaning) appears to portend increased efficiency of the tables disclosed in said British patent, when operated at higher "end elevation" than has heretofore been practiced.

Reference has been made above to the expressions "end elevation" and "side tilt." An understanding of these and other expressions will facilitate further disclosure. The deck of a concentrating table may be of any of a great variety of outline shapes, the oblique near-rhomboidal shape shown in said British patent being distinctive of one manufacturer. Customarily, such decks have a straight edge (herein called "discharge side") of considerable length; and another straight edge (herein called "discharge end" or "front") which makes a considerable angle with, and is usually shorter than, the discharge side. The end of the discharge side remote from the discharge end is the "back" or "head end"—the latter connoting the fact that the driving means (termed "head motion") is usually located in that vicinity. At some convenient place remote from the discharge side and near the head end, provision (such as a "feed box") is made for feeding the material to be treated on to the deck; and between the feed box and the discharge end, but remote from the discharge side, provision is made for supplying wash water to the deck. These parts are all conventional and per se form no part of the present invention. While such tables are forcibly reciprocated in a generally horizontal direction, and are usually referred to as horizontally moving, they are almost never operated with the decks truly level either in the direction of reciprocation or normal thereto. On the contrary, they are given "end elevation," which means that the decks slope at an angle (to the horizontal) of between a fraction of a minute and two degrees (depending upon the material being treated), so that the discharge end is higher than the head end; and they are given "side tilt," which means that the deck slopes at an angle (to the horizontal) of 4 to 8 degrees, so that the discharge side is lower than the areas on the deck where the "feed" and the water (called "wash water" in coal cleaning, but "dressing water" in ore treating, parlance) are deposited. The result is that the solid material of lowest specific gravity moves down-hill under the influence of gravity toward the discharge side, the solid material of highest specific gravity moves up-hill under the force of the head motion toward the discharge end, and the material of intermediate specific gravity moves under the combination of forces toward the corner (called the "middling corner") between the discharge side and the discharge end. Troughs or hoppers (called "launders") are provided along the discharge side, the discharge end and the middling corner, to catch the processed material falling from the edges of the deck. The launders are usually divided into sections, so as to segregate the fraction of the treated material which is substantially pure value from the reject fraction which is substantially free of value, and from the "middlings" which may contain some value entrapped with other material; and also, on occasion, to segregate the several fractions as to particle size.

The proper dividing line or "cut" between the value and the middling, as well as that between the middling and the reject, is always a matter of judgment. Hence, the collecting launders are mounted with their divisions near the estimated location of the several cuts, and troughs (called "cutting pans") are slidably mounted on the launders so as to divert material headed for the wrong launder to the proper launder when need be. In any given coal cleaning operation, the proper location of the cutting pans, once established, seldom needs to be changed unless a radically different grade of coal is encountered. The same is true of side tilt and end elevation. But in ore dressing operations, the proper dividing line between the various fractions is more fickle, and the operation must have careful attention so that the position of the cut can be immediately adjusted when need be. Frequently, in ore dressing, the optimum location of the cut vacillates so widely that movement of the cutting pan cannot cope with it. This requires adjustment of side tilt, and in the case of multiple deck tables, dictates the desirability that the individual decks be adjustable (at least as to side tilt) relative to each other and without interrupting the operation of the entire table.

It is therefore a specific object of the present invention to provide a multiple deck pendantly suspended table in which the individual decks are adjustable relative to each other while in motion.

Another object of the invention is to stabilize the individual decks of a multiple deck pendantly suspended table against secondary motion without substantially adding to the mass and detracting from the sensitivity thereof.

A further object of the invention is to provide a free floating multiple deck table wherein the reciprocating motion of each deck is parallel with the center line of the force which induces that motion irrespective of the degree of end elevation.

Other objects of the invention will be apparent to those skilled in the art from the foregoing background and the following disclosure when read in connection with the accompanying drawings, in which.

Generally stated, the invention contemplates a multiple deck pendantly suspended concentrating table of the general type disclosed in the aforesaid British patent, but in which the several decks are stabilized, at a position remote from the head motion, against secondary motion by restraining their tendency toward undulating and other movement relative to each other, and relative to the head motion. This is accomplished, in accordance with the preferred embodiment, by connecting the several decks together at their discharge ends by a rigid member and attaching the suspending cable or link to that member, so that all decks pendulate with the same amplitude, and preferably with their radius of pendulation in the same vertical plane as the center line of the driving force. The said rigid member is connected in load carrying relationship with each of the decks, and is stiff enough to maintain the several points of connection in fixed relationship and in vertical alignment, but none the less free for adjustment in side tilt. The rigid member may also have provision for adjusting the end elevation of the individual decks relative to each other. At the same time, the invention contemplates rendering the several decks capable of adjustment in end elevation and/or in side tilt, individually or collectively, without interrupting the operation of the apparatus.

The invention further contemplates that, in contrast to the teaching of said British patent, the pendantly supported head motion should not operate horizontally when the decks are operating with end elevation. On the contrary, it is advantageous to end-elevate the head motion to the same angular extent as the decks. While this cannot be done when the several decks of the multi-deck table are operated with different end elevations (which is rare), it is better to make a fair compromise than to run all decks deliberately out of parallelism with the movement of the head motion. On the other hand, where (as is usual) all the decks of a given table run at the same end elevation, improved performance can be achieved either by making the connection between the head motion and the decks rigid against jack-knifing in the sense of end elevation, and supporting the entire pendant structure for pendulation in unison; or by retaining the pivotal connection between the head motion and the deck structures, and retaining the independent suspension for the head motion as shown in said British patent, but providing a unitarily adjustable superstructure to which all supporting cables or links are anchored with equal radii of pendulance irrespective of the degree of end elevation.

Figure 1:
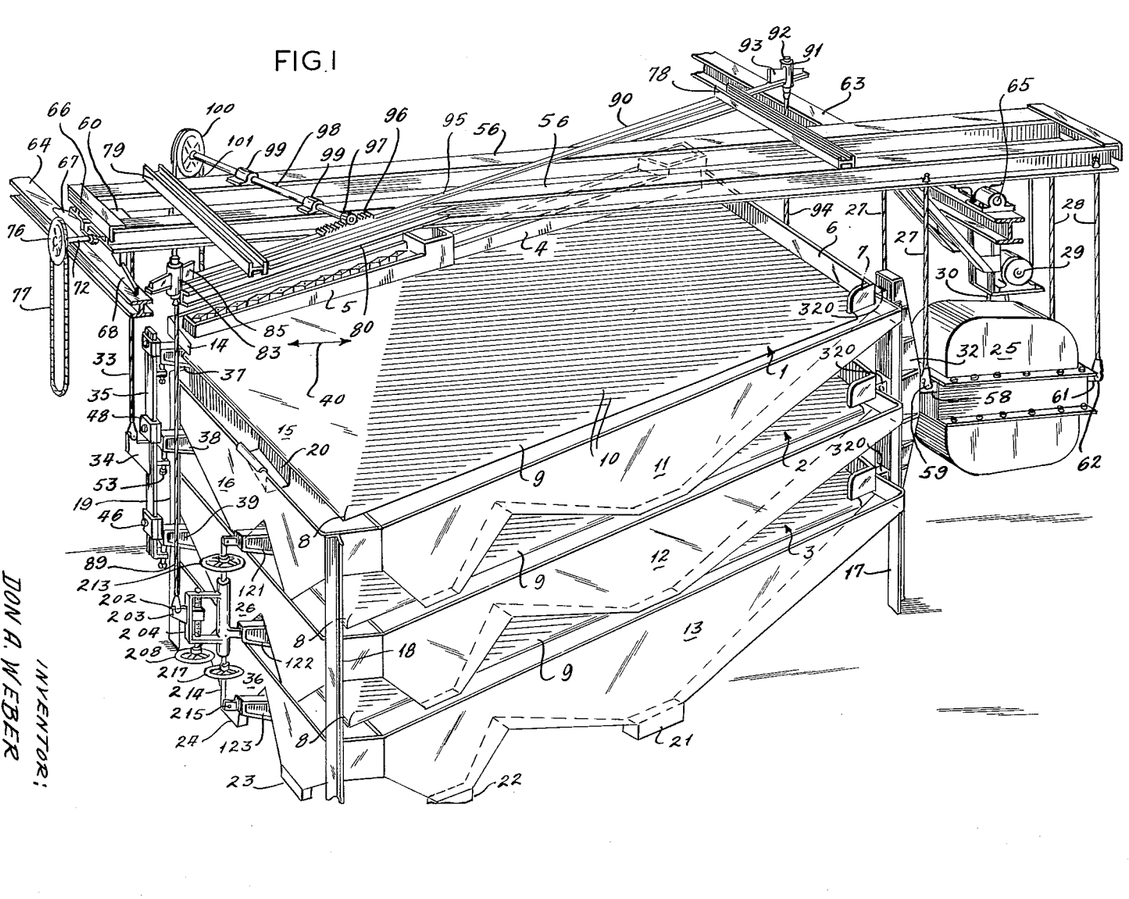
FIGURE 1 is a perspective view of a concentrating table embodying the invention and having three decks suspended for pendulation together from a common head motion.

Referring now to FIGURE 1 of the drawings, the invention is illustrated in the form of an embodiment having three reciprocable decks 1, 2, and 3, each provided with a feed box 4 and a wash water launder 5 of conventional type, but seen only on deck 1 in FIGURE 1. The feed boxes and wash water launders are located along the "high side" of each of the decks. In the form shown, each deck is provided with a headboard 6 which extends, to a slight extent, about the corner opposite the feed box, as shown at 7. The foreground corner 8 of deck 1 is denominated the "middling corner." Between the middling corner 8 and the extension 7 of headboard 6 is the so-called "discharge side" 9, where the surface of the deck bevels downwardly outside the riffled area 10 so as to overhang the open tops of collection launders such as 11 for deck 1, 12 for deck 2, and 13 for deck 3. Beyond the end of the wash water launder 5, all decks are provided with a sideboard extension 14 (seen only on deck 1 in FIGURE 1). Between the terminus of extension 14 and middling corner 8 is the "discharge end" 15, where the surface of the deck bevels downwardly so as to overhang the open tops of collection launders such as 16 for deck 1, 26 for deck 2, and 36 for deck 3. The riffles in the riffled area may be constructed and arranged in any desired manner which is appropriate for the intended use of the concentrating table, as well understood by those skilled in the art, and indeed, in some instances, the decks need not be riffled. The deck 1, as thus described, is well known in the art, and the invention is not limited to decks of the particular construction. In the embodiment illustrated, wherein all decks are intended to be supplied with raw material of the same consist, the decks 1, 2, and 3 are duplicates of each other, but in cases where the consist of the feed for one deck may differ from that of another, the decks may differ in detail.

The collection launders 11, 12, 13, 16, 26, and 36 are likewise of conventional construction, but may, if desired, differ. The several collection launders are fixedly supported from a floor or suitable under-structure by columns 17, 18, and 19 in the conventional manner, so that they do not move with the decks.

Figure 15:
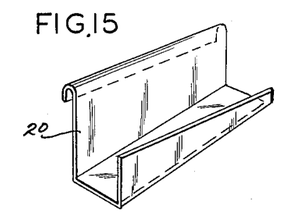
FIGURE 15 is a perspective view of a typical cutting pan.

Some or all of the collection launders may be equipped with a cutting pan, such as 20 (shown in FIGURE 1 in connection with launder 16, and in greater detail in FIGURE 15) of well-known type. The several collection launders are each provided with discharge ducts (shown only with launders 13 and 36), such as 21 and 22 for launder 13, and 23 and 24 for launder 36, it being understood that the launders 11, 12, 16, and 26 are similarly provided with discharge ducts not shown, all of which is conventional construction.

In contrast to the fixed support for the several collection launders, the several decks are pendantly supported for collective reciprocating movement, and otherwise mounted for occasional collective movement relative to fixed structures and occasional individual movement relative to each other. The reciprocating movement of the several decks is induced by any suitable head motion device, preferably of the type which inherently generates substantially horizontal reciprocatory motion that is characterized by quicker reversal at one end of the stroke than at the other. One form of such a head motion device is disclosed in the aforesaid British patent, and is suitable for use with this invention. Such a head motion device 25 is pendantly supported from an overhead structure by a pair of cables 27 at the front of the head motion device, and a pair of cables 28 at the rear of the head motion device. The head motion device is driven by an electric motor 29, or other suitable source of power, through a belt 30 which imparts rotating motion to a pulley 31 which in turn motivates a series of geared eccentric flywheels as shown and described in said British patent. The several eccentric flywheels are so coordinated in rotational speed, moments of eccentricity and centrifugal force as to generate a reciprocating motion in the generally horizontal direction, and the reciprocating motion is characterized by having a quicker reversal at the end of the stroke toward cables 27 than at the end of the stroke toward cables 28. The radii of pendulation provided by cables 27 and 28 are equal and such that, at the customary amplitude of less than about two inches, the path of pendulating movement of the head motion is, in the practical sense, rectilinear. It is preferred that the radius of pendulation be not less than about four feet so that the maximum finite departure from true rectilinear is only about ±0.005 inch.

Figure 11:
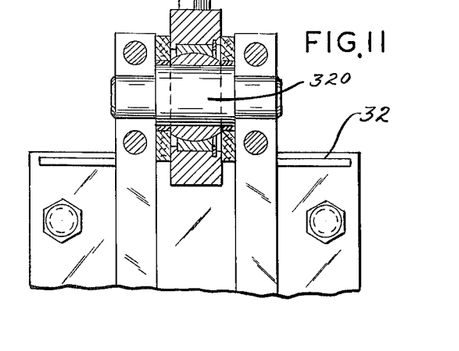
FIGURE 11 is a sectional view taken along line 11—11 of FIGURE 2 and showing the type of connection used between the head motion and the respective decks.

The head motion device 25 is connected through a head yoke 32 to the decks 1, 2, and 3, so as to transmit the reciprocatory motion to the decks in unison without intervening lost motion. In the embodiment shown (see FIGURES 2 and 11), the connection between the head yoke 32 and the underframes of the respective decks is made through three swivel connections 320 which enable each deck to be pivoted relative to the head yoke and the head motion to an extent necessary to accommodate variation in the side tilt of the decks (both individually and collectively), and to accommodate variation in the end elevation of the decks individually.

Figure 5:
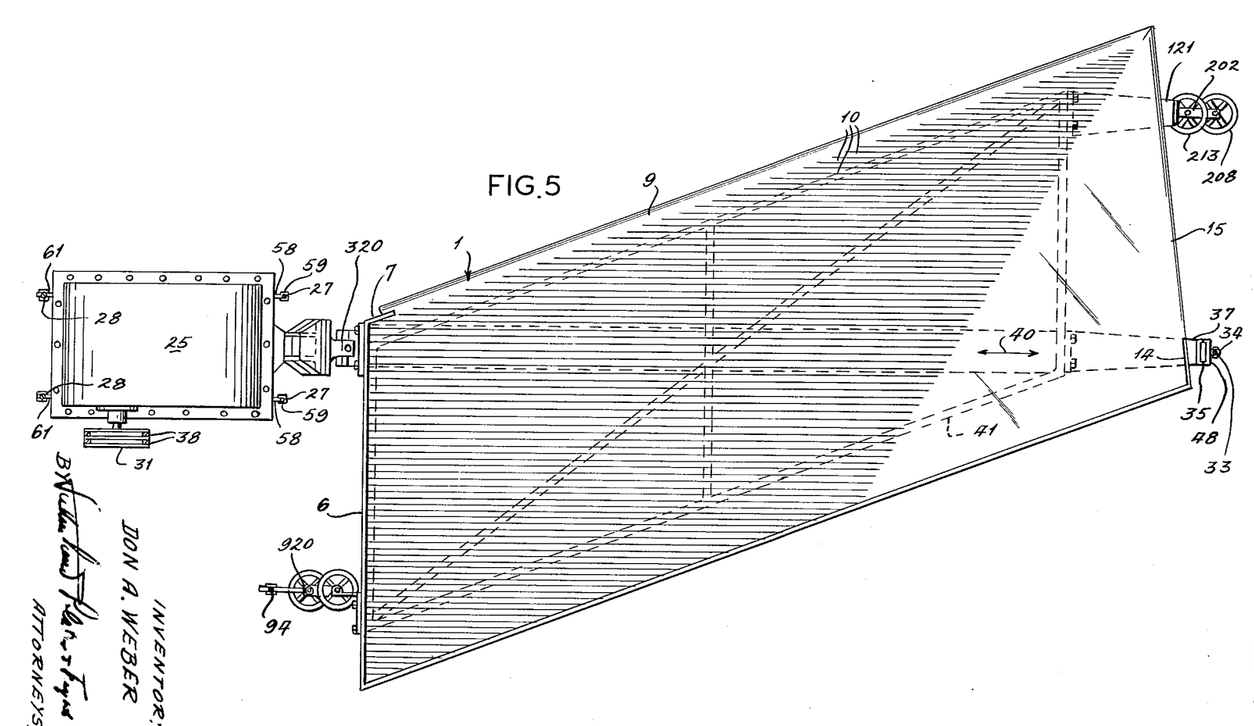
FIGURE 5 is a plan view of the deck and head motion of the concentrating table shown in FIGURES 1 through 4.
Figures 7, 8, 9, 16:
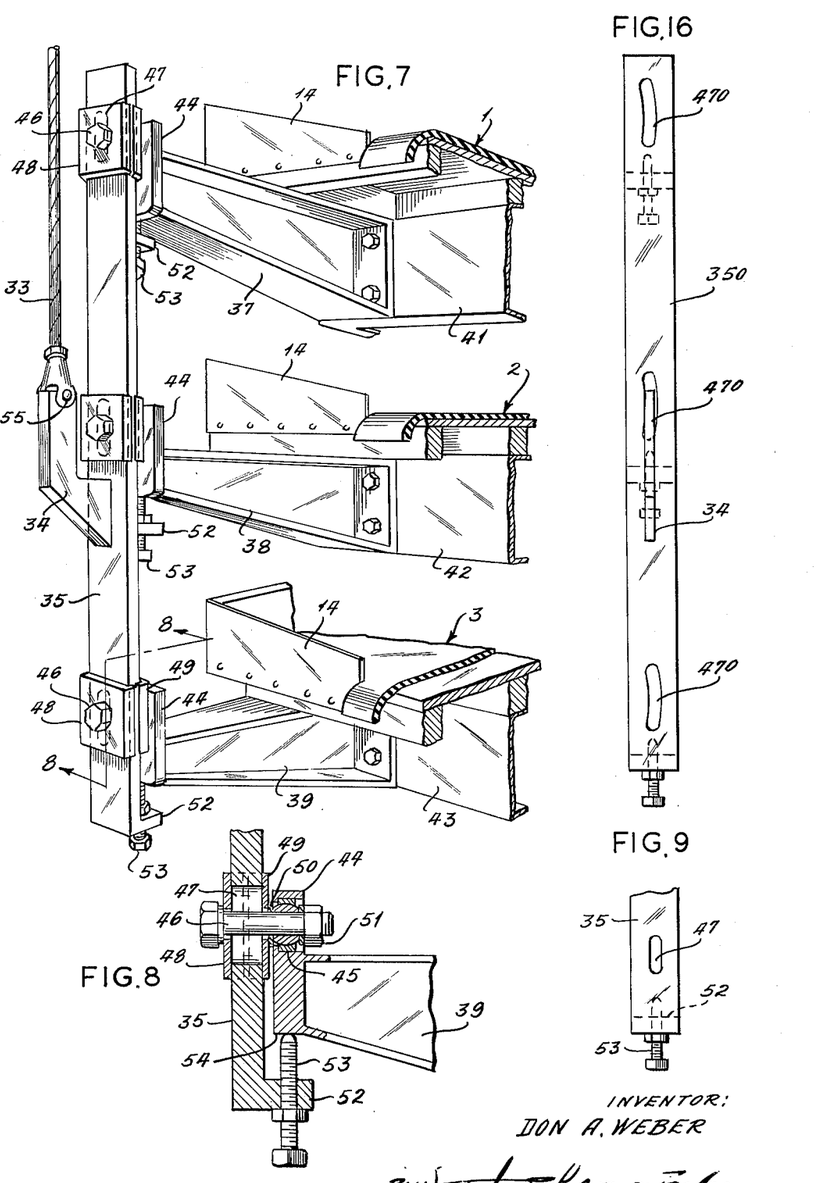
FIGURE 7 is a fragmentary perspective view of the discharge end suspension and deck-stabilizing arrangement.
FIGURE 8 is a sectional view taken along line 8—8 in FIGURE 7.
FIGURE 9 is a fragmentary front elevation of the yoke bar forming a part of the discharge end suspension and deck-stabilizing arrangement.
FIGURE 16 is a front elevation of an alternative form of stabilizing and individual side tilt control device.

The cables 27 and 28, which pendantly support the head motion, also pendantly support the adjacent ends of the decks 1, 2, and 3 through yoke 32 and swivel connections 320. The opposite ends of the decks 1, 2, and 3 are pendantly supported by a cable 33, the upper end of which is anchored to the overhead supporting structure previously mentioned, and the lower end of which is anchored to a lug 34 on a yoke bar 35 at a level above the center of gravity of the pendant mass. The yoke bar 35 is in turn connected through brackets 37, 38, and 39, respectively, to underframes 41, 42, and 43 for the respective decks (see FIGURES 2 and 7). Yoke bar 35 is stiff enough that when clamped in position, as hereinafter described, it stabilizes the three decks by maintaining them in alignment and at predetermined vertical spacing relative to each other. It is preferred that the entire pendant mass (including not only the decks, their underframes, and all other parts which move therewith, but also the load of material being treated on the deck) be balanced, as nearly as it can be anticipated, about the center line of the reciprocating force generated by head motion 25. The center line of the reciprocating force is designated by the arrow 40 in FIGURES 1 and 5. The yoke bar 35 is located on the center line of the reciprocating force (indicated by the arrow 40), and the details of its mounting are best shown in FIGURES 7 and 8, to which reference may now be had. At the corner of the sub-frames for each of the decks nearest yoke bar 35, brackets 37, 38 and 39 are rigidly connected and project outwardly beyond the discharge end of the several decks and beyond the launders 16, 26, and 36, preferably in alignment with the center line 40. Each of these brackets terminates in a flange 44, in the upper end of which is seated a swivel bearing 45. The detail construction at bracket 39 is shown in FIGURE 8, but it is identical for the other brackets. In the bearing 45, there is mounted a bolt 46 which extends through a slot 47 in yoke bar 35. Between the head of bolt 46 and the body of yoke bar 35, a channel-shaped thrust plate 48 is provided, and a similar thrust plate 49 is provided on the opposite side of yoke bar 35. Between thrust plate 49 and the ball part of bearing 45 is a washer 50. The arrangement is such that the nut 51 on bolt 46 may be drawn down tight to fix the position of the bolt relative to yoke bar 35 without interfering with freedom for limited rotation of flange 44 about the axis of bolt 46. Such permits adjustment in side tilt of the respective decks. The swivel form of bearing 45 additionally provides for relative rotation of the parts about a horizontal axis perpendicular (normal to the plane of FIGURE 8) to the axis of bolt 46, which is desirable for changes in end elevation of one deck relative to another.

On the side of yoke bar 35 opposite lug 34, there may, if desired, be provided a series of lugs 52, each of which has a threaded aperture for the accommodation of a set screw 53. For adjusting end elevation of one deck relative to the other, nut 51 may be relaxed so as to permit relative vertical movement between bolt 46 and yoke bar 35 to the limits of slot 47, and with the connection between the yoke bar and flange 44 thus relaxed, set screw 53 may be manipulated to raise or lower bracket 39 relative to lug 52 until the proper end elevation of the deck relative to the others is achieved. Thereupon, nut 51 may again be drawn down to clamp yoke bar 35 in operating position relative to bracket 39. Therefore, if nut 51 has been drawn down tight enough to retain the adjusted position of the yoke bar 35 relative to the deck, the set screw 53 may be relaxed. To facilitate adjustment of side tilt of the several decks while the apparatus is in operation without relaxing set screw 53, the lower surface 54 of bracket 39 (also 37 and 38), against which set screw 53 bears, is preferably rounded on a radius whose center is the axis of bearing 45.

Figure 10:
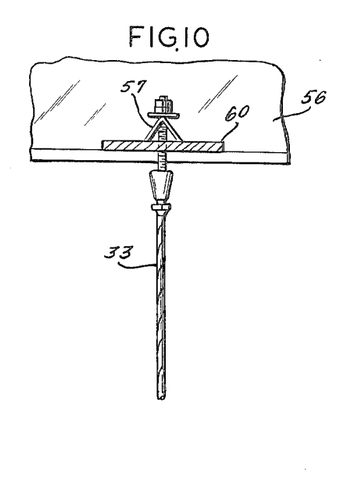
FIGURE 10 is a sectional view taken along line 10—10 of FIGURE 6 and showing the mode of connecting the discharge end suspension to the superstructure.

The supporting cable 33 is connected at its lower end to the lug 34 by a pivot pin 55 (see FIGURE 2) whose axis is perpendicular to the center line of the reciprocating force. The upper end of cable 33 is anchored to a bridge plate 60 extending between two longitudinal overhead beams 56 by a knife-edge pivot point 57 (see FIGURES 1, 2 and 10), so that the pivoting axes at both ends of cable 33 are parallel and astride the vertical plane which includes the center line of reciprocating force. The respective cables 27 are connected at their lower ends to lugs 58 mounted upon the housing of head motion 25 on opposite sides of head yoke 32. The connection between cables 27 and lugs 58 includes pivot pins 59. At their upper ends, the cables 27 are pivotally anchored to overhead beam 56 through a knife edge mounting corresponding to that shown in FIGURE 10. The cables 28 are similarly connected at their upper ends, and their lower ends are connected to lugs 61 at the rear end of the housing for the head motion 25, the connection being effected through pivot pins 62. Thus the upper and lower pivoting axes for all of the supporting cables 27, 28, and 33 are parallel and geometrically balanced with respect to the center line of the reciprocating force. Preferably, the distance between the upper and lower pivoting axes of the several cables 27, 28, and 33 is the same, and not subject to easy adjustment. Unless the distance between the upper and lower pivot points for the suspending members is thus maintained constant, the radius of pendulation of the several suspending members will not be constant, and undesired jack-knifing or flexing will occur, during reciprocation, at the connections 320 between head yoke 32 and the respective decks. Such jack-knifing or flexing introduces a vertical component into the reciprocation which varies the end elevation of the decks between the extremes of the reciprocating stroke, and thereby interferes with the proper performance of the table. While the suspending members 27, 28, and 33 have been shown and described as cables, rigid rods or links may be substituted for the cables where the radii of pendulation are constant.

Figure 2:
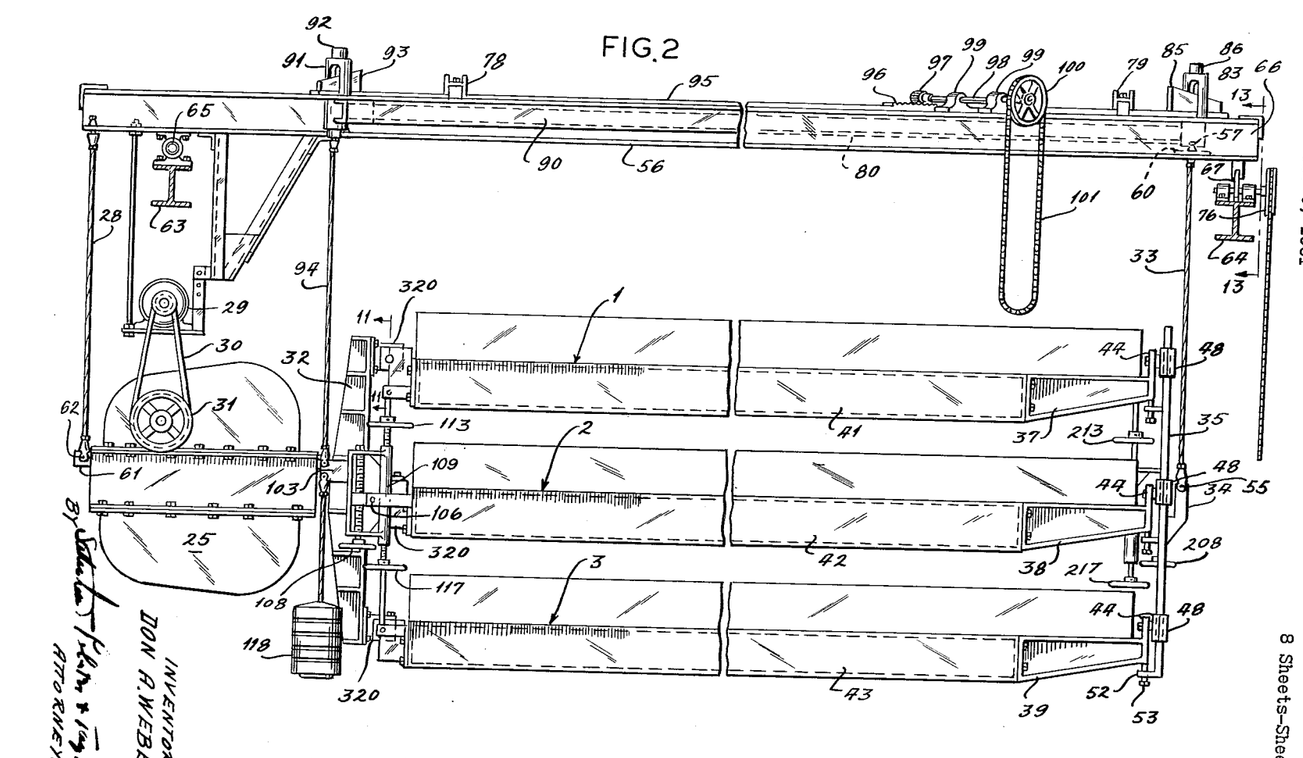
FIGURE 2 is a view in side elevation of the concentrating table shown in FIGURE 1 as seen from the side in the background of FIGURE 1.
Figures 3, 13, 14:
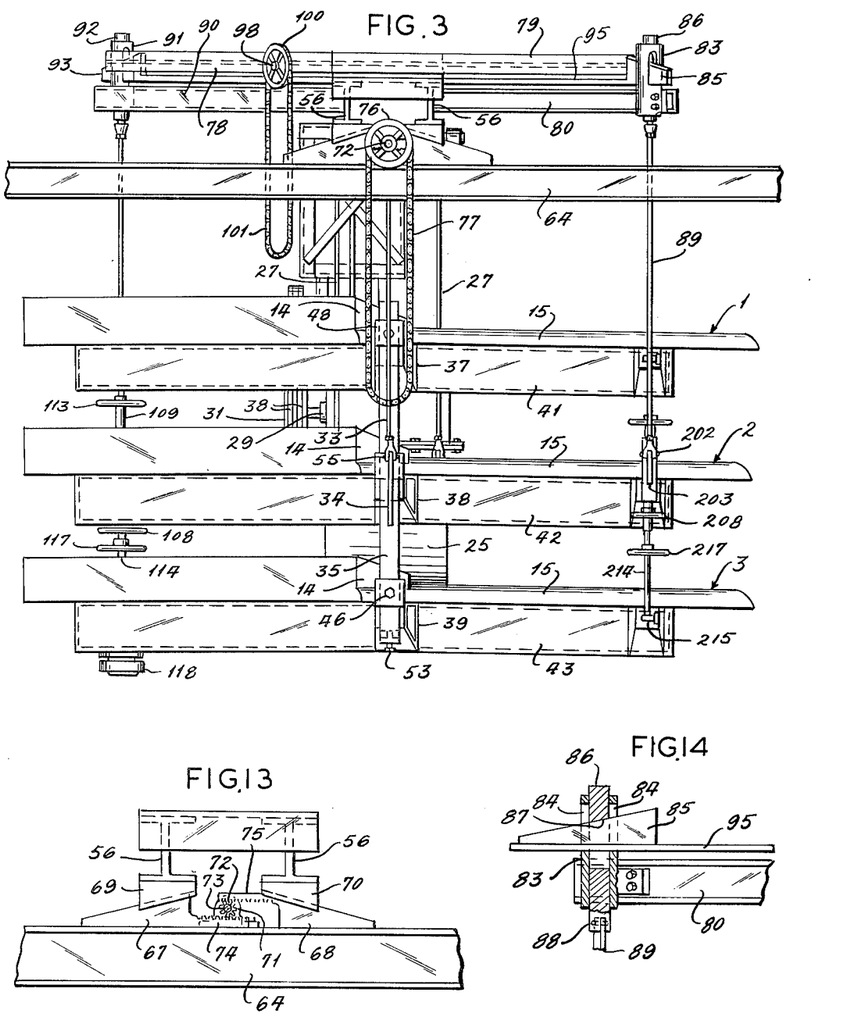
FIGURE 3 is an end elevation taken from the discharge end of the table shown in FIGURE 1, but with the collection launders omitted for clarity of illustration of the features of the invention.
FIGURE 13 is a sectional view taken along line 13—13 of FIGURE 2.
FIGURE 14 is a sectional view taken along line 14—14 of FIGURE 6.
Figure 6:
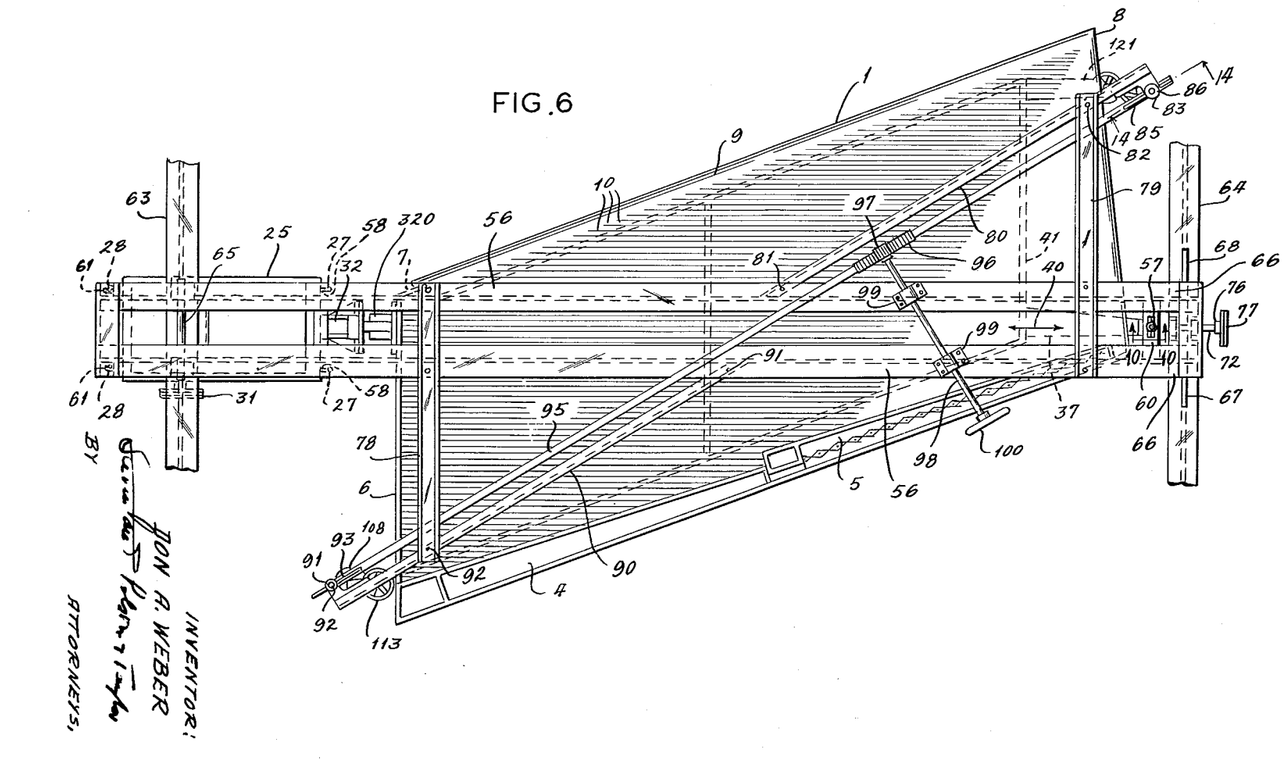
FIGURE 6 is a plan view of the superstructure from which the decks and head motion are suspended and showing the co-relation of those parts.

In the embodiment shown, the superstructure, of which beams 56 form a part, is mounted upon fixed beams 63 and 64 (see FIGURES 2, 3, 4 and 6), which may be, and usually are, a permanent part of the building in which the concentrating table is to be housed. As clearly shown in FIGURE 6, the two beams 56 extend in parallel spaced relation on opposite sides of the center line of the reciprocating thrust. The beams 56 are appropiately connected together by bridge plate 60 and otherwise, and, at their head motion end, are hingedly mounted upon beam 63 through a horizontal pivot pin 65. At their opposite ends 66, the beams 56 are mounted upon beam 64 through an adjustment mechanism, one form of which is shown in detail in FIGURES 3 and 13. In the form shown, the adjustment mechanism embodies a pair of wedges 67 and 68 resting in sliding relationship upon the upper surface of permanent beam 64. Mounted upon the lower surface of one of beams 56 is a wedge-shaped shoe 69, whose inclined surface is of corresponding angularity to the inclined surface of wedge 67 and in sliding engagement therewith. Preferably, the shoe 69 is provided with flanges which overhang the inclined surface of wedge 67. Similarly, between wedge 68 and the other of beams 56, there is provided a wedge-shaped shoe 70, which is identical with shoe 69, but mounted in the reverse relationship. Midway between beams 56, a pair of lugs 71 extend upwardly from beam 64. The lugs 71 provide the bearings for a shaft 72 upon which a pinion 73 is secured. The wedges 67 and 68 are respectively provided with tail pieces in the form of racks 74 and 75, the former extending below, and the latter extending above, pinion 73 and in engagement therewith. Consequently, upon rotation of shaft 72 in the counterclockwise direction (as seen in FIGURE 13), both wedge 67 and wedge 68 are drawn toward shaft 72, with the result that ends 66 of beams 56 are lowered relative to fixed beam 64, while the opposite ends of said beams, i.e., beyond hinge 65, are raised and the end elevation of the decks 1, 2, and 3 collectively decreased. Conversely, when the shaft 72 is rotated in the clockwise direction, the wedges 67 and 68 are forced away from shaft 72, and the end elevation of the several decks 1, 2, and 3 is increased. For convenience of manipulation while the concentrating table is in operation, shaft 72 may be provided with a sprocket 76 (see FIGURE 3) having an endless pull chain 77 threaded thereover, the pull chain being of such length as to make it easily accessible for manipulation from the floor level which is below deck 3.

In the embodiment shown, the superstructure also includes a cross-member 78 (see FIGURE 6) which extends perpendicularly to beams 56 above the head end of the table, and another cross-member 79 which extends perpendicularly to the beams 56, but in the opposite direction from cross-member 78, above the discharge end of the table. Upon one or both of cross-members 78 and 79, there is mounted mechanism for individually adjusting the side tilt of the respective decks 1, 2, and 3, each independently of the other. While, in the embodiment shown in the drawings, two such individual side tilt control mechanisms are shown (at diagonally opposite corners), it is to be understood that one will suffice under most conditions of operation. The individual side tilt control mechanism is rigid enough to stabilize the respective decks against secondary motion, such as flutter, at the corner to which it is applied, and it is obviously desirable to mount the stabilizer at the corner where it is most needed. While such secondary motion is rare, when it occurs, it is usually attributable to some idiosyncrasy in the construction or behavior of the deck or its sub-frame; and exhibits itself more often at the middling corner than at the feed corner. These conditions dictate that the individual side tilt control mechanism be located adjacent the corner below cross-member 79. On the other hand, where no deck exhibits a tendency for secondary motion at the middling corner, it is preferable to locate the individual side tilt control mechanism adjacent the corner below cross-member 78, thereby to provide, at the middling corner, a less obstructed view of the separations being performed on the several decks.

Regardless of the end of the table chosen for the location of the individual side tilt control mechanism, the embodiment shown will accommodate it. For middling corner location, the individual side tilt control mechanism is mounted upon a diagonal beam 80 secured at one end 81 to one of beams 56, and near its other end at 82 to the extremity of cross-member 79. On the outer extremity of beam 80, there is mounted a tubular fitting 83, the detail of which is shown in FIGURE 14. The fitting 83 projects upwardly above the upper surface of beam 80, and is provided with diametrically opposite slots 84 of width and length sufficient to accommodate a slidable wedge 85. Mounted in slidable relationship within the fitting 83 is a follower 86, likewise slotted at 87 to accommodate wedge 85. The follower 86 projects outwardly from the bottom of fitting 83, and is there provided with a pivotal connection 88 for a suspending member 89, if desired. The axis of the pivotal connection 88 is parallel to, and preferably in the same vertical plane as, the pivoting axis 57 for supporting member 33. Similarly, for feed box corner location of the individual side tilt control, there is provided a diagonal beam 90, identical with diagonal beam 80, but in the reverse orientation. The beam 90 is supported by cross-member 78, and is provided at its extremity with a fitting 91, follower 92, and wedge 93, identical to the parts described above in association with fitting 83, but in the reversed relationship. At its lower end, follower 92 has a pivotal connection (the axis of pivoting being parallel with the pivot axes 57 and 88) for attachment of a suspending member 94, if desired.

Figure 4:
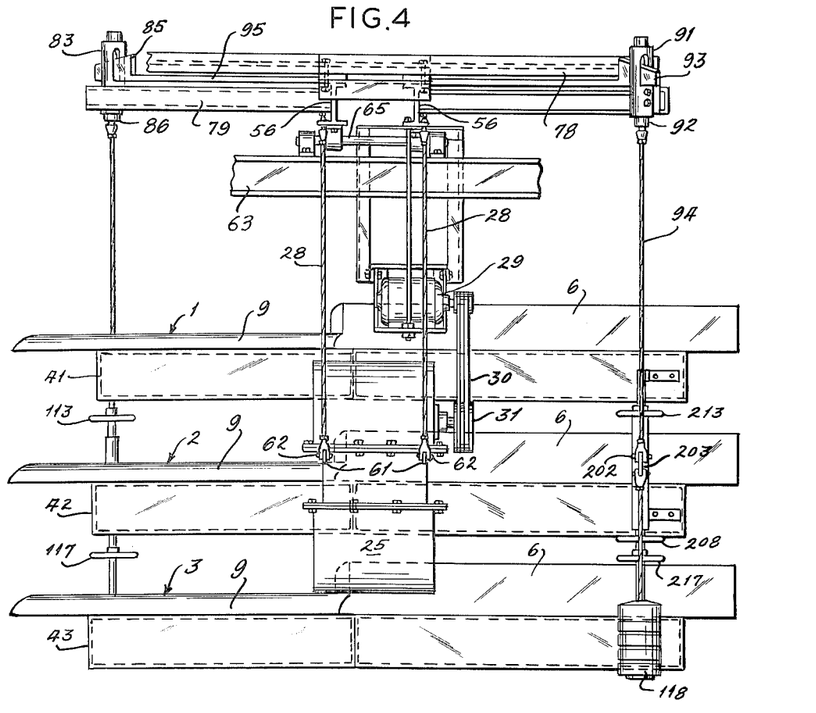
FIGURE 4 is an end elevation taken from the head end of the table shown in FIGURE 1, again with the collection launders omitted.

The mountings just described permit variation and control of the side tilt of all decks collectively. If the individual side tilt control mechanism is to be mounted at the middling corner, as shown in FIGURE 3, it is connected to the lower end of cable 89, and hence raising or lowering the upper anchorage of cable 89 correspondingly raises or lowers the entire individual side tilt control mechanism connected thereto, and thus decreases or increases the side tilt of all decks collectively and in the same degree. Correspondingly, if the individual side tilt control mechanism is to be mounted at the feed box corner, as shown in FIGURE 4, it is connected to the lower end of cable 94, and hence raising or lowering the upper anchorage of cable 94 correspondingly raises or lowers the entire individual side tilt control mechanism connected thereto, and thus increases or decreases the side tilt of all decks collectively and in the same degree. To accomplish such variation in the side tilt of the decks collectively, irrespective of the corner of the table at which the individual side tilt control mechanism is located, and irrespective of whether there are individual side tilt control mechanisms at one or both ends, wedges 85 and 93 are interconnected by a rod 95 which extends diagonally across the superstructure, but is movable relative thereto in the direction of the length of rod 95. Near its midsection, there is secured to rod 95 a rack 96, which is in engagement with a pinion 97 mounted upon a shaft 98. The shaft is mounted through bearings 99 to the upper side of beams 56. For ready manipulation while the table is in operation, shaft 98 is provided with a sprocket 100 having an endless pull chain 101 threaded thereover. The arrangement is such that when the shaft 98 is rotated in its clockwise direction, as seen in FIGURES 2 and 3, the wedges 85 and 93 are moved leftwardly so as to lower follower 86 (with its depending attachments, if any) and raise follower 92 (with its depending attachments, if any), thereby increasing the side tilt of all decks collectively; and when the shaft 98 is rotated in its counterclockwise direction, rod 95 moves rightwardly so as to raise follower 86 (with its depending attachments, if any) and lower follower 92 (with its depending attachments, if any), thereby decreasing the side tilt of all decks collectively.

Figure 12:
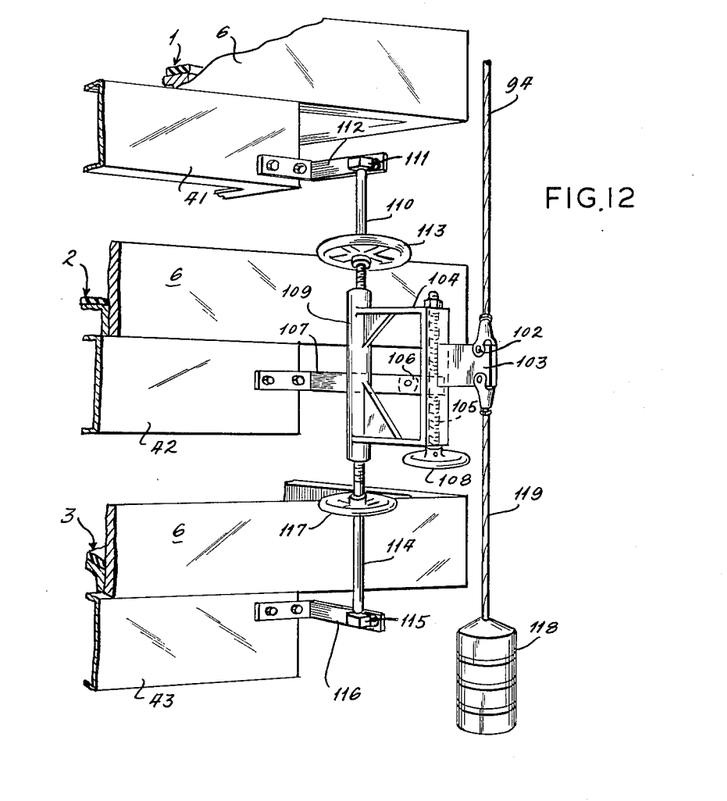
FIGURE 12 is a persepective view of one form of mechanism for controlling and varying the side tilt of the several decks each independently of the other.

The preferred form of individual side tilt control mechanism is shown in FIGURE 12 as applied to the feed box corner of the table, and is pivotally connected to the lower end of suspending member 94, shown as a cable, but which may be a rod or link because its radius of pendulation is invariable. The pivotal connection is accomplished through a pin 102, whose axis is parallel with that of pivot pins 59 (at the lower end of cables 27) and pivot pin 55 (at the lower end of cable 33). Pivot 102 traverses a lug 103 which projects from a rigid frame 104. At the side of frame 104 adjacent bracket 103, a worm 105 is journalled for rotation without relative axial movement. A follower 106 has one end in threaded engagement with worm 105, and has its other end pivotally attached to a bracket 107 secured to underframe 42 of deck 2. Worm 105 is provided with a handwheel 108, rotation of which moves follower 106, bracket 107, and consequently adjacent corner of deck 2, upwardly or downwardly relative to the position of lug 103 and frame 104, thereby increasing (if follower 106 is moved upwardly relative to lug 103) or decreasing (if follower 106 is moved downwardly relative to lug 103) the side tilt of deck 2 independently of the other decks.

At its end remote from lug 103, frame 104 is provided with an internally threaded barrel 109. Into the upper end of barrel 109, there extends a rod 110, the lower half of which is threaded for engagement with the internal threads of barrel 109. The upper end of rod 110 is journalled for rotation, but fixed against relative axial movement within a bearing 111 mounted upon a bracket 112, which latter is secured to underframe 41 for deck 1. A handwheel 113 is fixed on rod 110 for imparting rotational movement to the latter. Upon rotation of handwheel 113, the distance between bracket 112 and barrel 109 is increased or decreased, depending upon the direction of rotation of the handwheel, thereby to control the side tilt of deck 1 independently of the other decks. Similarly, a rod 114, which is threaded for the upper half of its length, is received within the lower end of internally threaded barrel 109. The lower end of rod 114 is journalled for rotation within, but restrained against axial movement relative to, a bearing 115, which latter is mounted upon a bracket 116 secured to underframe 43 for deck 3. Rod 114 is also provided with a handwheel 117 for rotation of rod 114 to vary the distance between barrel 109 and bracket 116, and thereby individually controlling the side tilt of deck 3. The bearings 111 and 115 are connected to the respective brackets 112 and 116 by any suitable type of swivel connector, such as that shown in FIGURE 8.

The distance between the upper and lower pivot axes of suspending member 94 is preferably the same as the distance between the upper and lower pivot axes of suspending members 27, 28, and 33. Unlike suspending members 27, 28, and 33, suspending member 94 is not intended to sustain any substantial part of the load of the floating mass when the table is designed and operated in perfectly balanced condition, but, as indicated hereinbefore, such perfect balance is seldom achieved in actual practice. When the imbalance of the table is on that side of the center line of reciprocating thrust which tends to impose a load on suspending member 94, it will remain taut, but when the imbalance is on the opposite side of the center line of the reciprocating thrust, provision must be made for maintaining suspending member 94 taut, else the imbalance will induce an increase in side tilt of the table. To avoid this, a weight 118, of magnitude appropriate for the operating conditions, is suspended from lug 103 by means of a cable 119.

The mechanism just described readily permits quick and facile adjustment of the side tilt of each deck, independently of the others, while the table is in operation; and the interconnection of parts is sufficiently rigid to positively maintain the several in predetermined spaced relationship, thereby stabilizing the same against secondary motion. These functions are achieved regardless of whether the individual side tilt control mechanism is itself directly suspended from the superstructure; but where, as in most ore dressing operations, sensitivity is important, it is desirable to separately suspend the individual side tilt control mechanism as shown and described. Furthermore, their separate suspension enables them to be used as part of the collective side tilt control.

As shown in FIGURES 1 and 3, the individual side tilt control mechanism above described is duplicated at the middling corner of the table, and the several parts are there designated by reference characters in the "200" series with the last two digits corresponding to those shown in FIGURE 12. Since the parts are identical, albeit the operation is reversed, repetition of the description of the detail would be surplusage. Suffice it to say that the individual side tilt control mechanism at the middling corner is connected to the underframes 41, 42, and 43, respectively, by brackets 121, 122, and 123 of construction comparable to brackets 37, 38, and 39, instead of through brackets such as 107, 112, and 116 shown in FIGURE 12. The brackets 121, 122, and 123 project through the crotches of collection launders 16, 26, and 36, respectively, so as to mount the parts of the mechanism exteriorly of the launders. The individual side tilt control mechanism at the middling corner is connected to the lower end of suspending cable 89 by a pivot pin 202, whose axis is parallel with the axis of pivot pin 55 for cable 33 and preferably in the same vertical plane; and it is also parallel to the axes of pivot pins 59 for cables 27.

As in other instances, the radius of pendulation provided by suspending member 89 is invariable, and the same as the radius of pendulation of cables 27, 28, and 33.

In FIGURE 16, there is illustrated an alternative individual side tilt control and stabilizing device which is suitable for use at the middling corner in situations where great ease of individual side tilt adjustment is not important. This consists of a yoke bar 350, identical in all respects to yoke bar 35 except for the size and shape of three slots 470. The slots 470 are longer than their counterparts 47 in yoke bar 35. Whereas slots 47 are only long enough to accommodate normally expected differential in end elevation among the several decks, slots 470 must additionally be long enough to accommodate normally expected differential in side tilt among the several decks. The sides of slots 470 are arcs of circles whose radii are the distance between them and the axis of the bolt 46 for the same deck. The stabilizing bar 350 can be connected to brackets 121, 122, and 123, in like manner to the connection of yoke bar 35 to brackets 37, 38, and 39. When the connecting bolts are drawn down tight, bar 350 positively restrains relative movement of the middling corners of the decks relative to each other, maintains them in predetermined spaced relation, and thereby stabilizes them against secondary motion. The bar 350 may, if desired, be pivotally attached to the lower end of cable 89, or it may be carried solely by its mooring to brackets 121, 122, and 123.

From the foregoing description, those skilled in the art will understand that, by virtue of the constancy and invariability of the radii of pendulation provided by the several suspending members, the motion of any point on the deck, induced by the reciprocatory force supplied by the head motion 25, is always in a direction parallel with that of any point on the head motion itself; that by virtue of the rigidity with which the several decks are connected together at their discharge ends, all decks respond alike to the reciprocatory motion; that the construction shown and described provides for adjustment, while the table is in operation, of both side tilt and end elevation of the several decks both individually and collectively; and that the suspending and control structure is such as to stabilize the several decks against secondary motion where such is most likely to occur. These features provide a multideck, free-floating concentrating table which is so discriminating in its action, so easily adjusted while in operation, and so sensitively responsive to adjustment in side tilt and end elevation, that it is suitable for industrial use in ore dressing with as high a degree of efficiency as foundation-mounted, single deck tables, but without the objectionable space-consuming and vibration-inducing characteristics of the latter.

While one complete embodiment of the invention has been described in detail, and certain alternatives in construction suggested, it is not to be understood that the invention is limited to the embodiment shown in the drawings and described in detail. On the contrary, it is realized that there will be obvious to those skilled in the art many variations, modifications, and alternatives of construction which do not depart from the spirit and substance of the invention, and it is therefore to be understood that the foregoing description and the accompanying drawings are intended to illustrate its practical application, rather than to limit the scope of the invention.

Having thus described the invention, what is claimed and desired to be secured by Letters Patent is:

1. In a multiple deck pendantly supported concentrating table having a head motion of the polyeccentric flywheel type which inherently generates reciprocating motion having quicker reversal at one end of the stroke than at the other, said head motion having an axis extending centrally thereof in the direction of said reciprocating motion, a plurality of imperforate decks angularly adjustable relative to each other, and means balanced about said axis connecting all decks to the head motion, the improvement which comprises, rigid means connecting all decks together at a point remote from the head motion, said rigid means being balanced about said axis and having stiffness such as to maintain said decks in predetermined vertical spacing relative to each other.

2. The improvement of claim 1 wherein a pendant support for all decks is connected to said rigid means.

3. The improvement of claim 1 wherein said rigid means is connected through a pendant support to overhead structure, said decks are jointly connected, adjacent said head motion, through a pendant support to overhead structure, and all said pendant supports have the same radius of pendulation.

4. The improvement of claim 1 wherein a pendant support for all decks is connected to said rigid member above the collective mass centers of said decks.

5. In a multiple deck pendantly supported concentrating table having a head motion of the polyeccentric flywheel type which inherently generates reciprocating motion having quicker reversal at one end of the stroke than at the other, the improvement which comprises, means for transmitting force from said head motion to said decks, said means including a pivot axis, parallel with said reciprocating motion, for permitting variation in side tilt of the decks, and means for independently adjusting the side tilt of each deck relative to the others while the head motion is in operation.

6. In a multiple deck pendantly supported concentrating table having a head motion of the polyeccentric flywheel type which inherently generates reciprocating motion having quicker reversal at one end of the stroke than at the other, the improvement which comprises, a supporting framework, an auxiliary structure supporting the upper ends of the pendant supports for the decks and head motion, and means for varying the elevation of said auxiliary structure relative to said supporting framework whereby to control side tilt or end elevation of the decks.

7. The machine of claim 6 in which the pendant supports have their upper ends pivoted upon said auxiliary structure and have their lower ends pivoted to a component of said table, the length of all said pendant supports between their upper and lower pivots being substantially equal.

8. A concentrating table having a head motion of the type which inherently generates reciprocatory force which has quicker reversal at one end of a substantially horizontal stroke than at the other end thereof, a plurality of decks superimposed one above the other, means for pendantly supporting said decks and said head motion from a fixed structure, said means including pendant suspending members each pivotally connected at its lower end to one of said head motion and decks and each pivotally connected at its upper end to a relatively fixed support, said pendant suspending members all being of the same length between said pivotal connections.

9. In a multiple deck pendantly supported concentrating table having a head motion of the type which inherently generates reciprocating motion having quicker reversal at one end of the stroke than at the other, the improvement which comprises, fixed supports located above the decks and head motion, an overhead structure mounted upon but movable relative to said fixed supports, a plurality of suspension members depending from said overhead structure and connected at their lower ends with said head motion and said decks, and means for tilting said overhead structure relative to said fixed supports.

10. A concentrating table having a floating structure including a head motion for generating substantially rectilinear reciprocatory force in a substantially horizontal direction, said head motion having an axis extending centrally thereof in the direction of reciprocation, a plurality of superimposed decks, and a force transmitting connection between each of said decks and said head motion, said connection being inflexible in the direction of said reciprocating force; an overhead support for said floating structure; at least three suspension members depending in substantially spaced relationship from said overhead support and connected at their lower ends with said floating structure, at least two of said suspension members being connected to said floating structure on opposite sides of and at equal horizontal distances from said axis, and another of said suspension members being connected to said floating structure at a position which is a substantial distance away from said first-mentioned two in the direction of and which is aligned with said head motion axis.

11. The table of claim 10 wherein the several suspension members provide the same radii of pendulation for the parts of the floating structure to which they are respectively connected.

12. In a multiple deck pendantly supported concentrating table having a head motion of the polyeccentric flywheel type which inherently generates reciprocating motion having quicker reversal at one end of the stroke than at the other, said decks and head motion being supported by a plurality of suspending members connected to and depending from an overhead structure, the improvement which comprises, the radii of pendulation of all said suspending members being the same.

13. The improvement of claim 12 in which the relative altitude of the connection between said suspending members and said overhead structure is concomitantly adjustable.

14. The combination with a concentrating table of the multiple deck type having at one end thereof a head motion of the polyeccentric flywheel type which inherently generates reciprocating motion having quicker reversal at one end of the stroke than at the other, all pendantly suspended from a fixed structure, of: relatively rigid means connecting said decks together at their ends remote from said head motion in predetermined vertically spaced relationship and in vertical alignment with each other, said rigid means being aligned with the center line of reciprocating motion generated by said head motion, an overhead support hinged to said fixed structure for limited tilting movement relative to said fixed structure, a plurality of suspending members pivotally connected to and depending from said overhead support, some of said suspending members having their lower ends pivotally connected to said head motion, another of said suspending members having its lower end pivotally connected to said rigid means, all said pivotal connections having their axes substantially horizontal and substantially perpendicular to the direction of said reciprocating force, all said suspending members having their interpivotal distances equal, a pair of fittings mounted upon said overhead support and in substantially spaced relationship lengthwise of and on opposite sides laterally of the center line of reciprocating motion, a pair of anchor parts mounted respectively in said fittings and movable relative thereto in the substantially vertical direction, means for concomitantly moving said anchor parts in opposite vertical direction relative to their respective fittings, a suspension member depending from at least one of said anchorages and connected at its lower end with a rigid member, and said rigid member having separate adjustable connections with each of said decks at a position substantially horizontally displaced from the center line of reciprocating force.

15. The combination of claim 14 wherein each of the adjustable connections on said rigid member comprises quick operating means for moving the adjacent part of one deck vertically relative to said rigid member without affecting the position of another deck relative to said rigid member.

16. In a multiple deck pendantly supported concentrating table having a head motion of the polyeccentric flywheel type which inherently generates reciprocating motion having quicker reversal at one end of the stroke than at the other, said head motion having a force transmitting connection with the several decks and having an axis extending centrally thereof in the direction of said reciprocating motion, the improvement which comprises, a rigid member connecting all decks together at a point remote from the head motion, said rigid member being aligned with said head motion axis as projected and connected to a pendant support for all decks.

17. The improvement of claim 16 wherein the connection between the pendant support and the rigid member is above the collective mass centers of said decks.

18. In a multiple deck pendantly supported concentrating table having a head motion of the polyeccentric flywheel type which inherently generates reciprocating motion having quicker reversal at one end of the stroke than at the other, the improvement which comprises, a rigid member connecting all decks together at a point remote from the head motion, said rigid member having a pivotal connection with each of said decks, and the axis of connection being in the direction such as to permit variation in side tilt of the decks.

19. In a multiple deck pendantly supported concentrating table having a head motion of the polyeccentric flywheel type which inherently generates reciprocating motion having quicker reversal at one end of the stroke than at the other, said head motion having an axis extending centrally thereof in the direction of said reciprocating motion, means balanced about said axis connecting the head motion to the decks, the improvement which comprises, said head motion being so positioned with respect to said decks that the weight of and connected to each deck is substantially balanced about said axis as projected, said connecting means including for each deck a pivot axis substantially parallel with said head motion axis, and means for adjusting the side tilt of the decks relative to each other while the head motion is in operation without varying the end elevation thereof at said axis.

20. In a multiple deck pendantly supported concentrating table having a head motion of the polyeccentric flywheel type which inherently generates reciprocating motion having quicker reversal at one end of the stroke than at the other, said head motion having an axis extending centrally thereof in the direction of said reciprocating motion, the improvement in means for adjusting end elevation of the decks collectively which comprises, rigid means sustaining both said head motion and said decks, said regid means being pivotally mounted upon a horizontal axis transverse to the direction of said head motion axis, and being of stiffness such as to maintain the angular orientation of the decks relative to said head motion axis as the end elevation of the decks collectively undergo change.

21. A concentrating table having a head motion of the type which inherently generates reciprocatory force which has quicker reversal at one end of a substantially horizontal stroke than at the other end thereof, said head motion having an axis extending centrally thereof in the direction of reciprocation, a plurality of decks superimposed one above the other, a connection between said head motion and said decks for transmitting reciprocating force therebetwen without lost motion, and means for pendantly supporting said decks, said head motion and said connection from a fixed structure to cause the reciprocation path of a point on a deck to remain parallel with said axis irrespective of end elevation.

References Cited by the Examiner

UNITED STATES PATENTS

| | | | |
|---|---|---|---|
| 771,107 | 9/1904 | Wall | 209—441 XR |
| 1,091,675 | 3/1914 | Leeper | 209—317 |
| 1,201,151 | 10/1916 | Cooley | 209—441 X |
| 3,075,644 | 1/1963 | Ambrose | 209—503 |

FOREIGN PATENTS 837,136  6/1960  Great Britain.

HARRY B. THORNTON, *Primary Examiner.*

ROBERT A. O'LEARY, EDWARD J. MICHAEL,
*Examiners.*